United States Patent [19]
Reed

[11] 3,859,583
[45] Jan. 7, 1975

[54] PULSE-WIDTH MODULATION CONVERTER CIRCUIT PROVIDING ASYMMETRY CORRECTION AND CURRENT MONITORING

[75] Inventor: Ray Allen Reed, Bolingbrook, Ill.

[73] Assignee: Bell Telephone Laboratories, Incorporated, Murray Hill, Berkeley Heights, N.J.

[22] Filed: Oct. 23, 1973

[21] Appl. No.: 408,609

[52] U.S. Cl. .................................. 321/2, 321/12
[51] Int. Cl. ........................................ H02p 13/22
[58] Field of Search ............... 321/2, 9, 18, 11–13; 331/113 A

[56] References Cited
UNITED STATES PATENTS

| | | |
|---|---|---|
| 3,439,251 | 4/1969 | Schaefer .................... 321/2 X |
| 3,648,150 | 3/1972 | Kernick et al. ............... 321/9 A |
| 3,657,631 | 4/1972 | Martens et al. .............. 321/11 X |
| 3,697,855 | 10/1972 | Kernick et al. ............... 321/9 A |
| 3,710,229 | 1/1973 | Jessee ........................ 321/9 A |
| 3,737,756 | 6/1973 | Hasley et al. ................. 321/2 |

Primary Examiner—William H. Beha, Jr.
Attorney, Agent, or Firm—W. H. Kamstra

[57] ABSTRACT

A dc-to-dc voltage converter circuit regulated by pulse-width modulation techniques in which correction circuitry is provided to maintain balanced conduction in the converter switching transistors. The correction circuitry monitors the conduction of each transistor by means of a sensing transformer in a circuit common to the emitters of both transistors and an imbalance signal is derived when the emitter currents are unequal in amplitude. The imbalance signal in conjunction with one or the other transistor control signals adjusts the transistor drive circuits in turn to adjust the transistor duty cycles to obtain the required conduction symmetry. The same imbalance signal is employed in comparison with predetermined signal levels to monitor various circuit current levels for circuit protection.

13 Claims, 3 Drawing Figures

PULSE-WIDTH MODULATION CONVERTER CIRCUIT PROVIDING ASYMMETRY CORRECTION AND CURRENT MONITORING

BACKGROUND OF THE INVENTION

This invention relates to power supply circuits and more particularly to such circuits adapted to convert a dc voltage of one magnitude to a dc voltage of another magnitude. The specific power supply with which the invention is concerned is characterized as being of the transformer coupled, pulse-width modulator type.

Most communication and data processing systems employ a number of power converters for transforming a raw dc supply voltage to a well regulated and filtered dc voltage of a lesser magnitude. One well-known and widely used power converter for this purpose is of the transformer coupled, push-pull type and employs pulse-width modulation for output voltage regulation. In a typical such converter, the pulse-width modulator provides two phase-displaced outputs which, by means of appropriately applied base drive currents, alternately and periodically control the conduction of a pair of power transistors. Output regulation is achieved by adjusting the duty cycle of the two outputs of the transistor stage as a function of the converter output voltage. This converter arrangement presents at least two problems.

The characteristics of the power transistors may not be precisely matched with the result that the alternating signals generated thereby are not equal in magnitude and/or duration. Thus, for example, a slight difference in saturation voltages or in storage or delay times of the transistors may cause the voltage-time product of the voltage waveform applied to the power transformer primary windings of the converter to differ for alternate half cycles. As a result, a direct current component appears in the effective primary winding voltage which may rapidly drive the transformer core into saturation. This saturation can induce an excessive peak current in the affected transistor which could cause its severe damage thereby reducing its efficiency with a possible eventual circuit failure. In the past, this asymmetry problem has been variously dealt with by such measures as carefully matching the transistor characteristics or ensuring an absolutely symmetrical construction of the power transformer in order to minimize the generation of unequal output pulses. Employing both a transformer and transistors rated beyond their normal capacity also has been resorted to in order to alleviate the effects of unequal pulse widths. Other measures include the insertion of an inductor into the main current path to inhibit rapid current changes which in turn serve to prevent damaging saturation current levels. Each of these methods is effective only at the expense of circuit cost and efficiency. When large numbers of power converters are involved, the cost of providing precisely matched transistor pairs could prove significant. On the other hand, employing over-rated transformers and transistors reduces overall circuit efficiency.

A second problem encountered in the operation of the aforementioned prior art power converter is that of circuit protection against sudden changes in load current. In the past current protection has assumed a number of forms. Fuses, thermal and magnetic circuit breakers, and amplifier sensing means, for example, have been employed as conveniently available devices to function as circuit protectors; each, however, suffers some disadvantage. Fuses and thermal and magnetic devices are relatively slow and dissipate power since each introduces resistance in the circuit. Amplifier means frequently require interface circuitry where points in the circuit are floated at different voltage levels. The circuit protection problem is a serious one in high current, low voltage power converters, for example, since many failures that occur such as shorted components or signal paths will present a high impedance. As a result, the fault currents, although not exceeding a specified fuse maximum limit, may still be sufficiently high to cause equipment damage and present a fire or safety hazard.

It is accordingly one object of this invention in one aspect thereof to compensate for any asymmetry in the characteristics of the power transistors in a pulse-width modulated power converter.

It is also an object of this invention to monitor current levels at various points in a pulse-width modulated power converter to ensure required converter input and output current levels and to prevent current changes therein outside a permissible range.

A further object of this invention is to provide a novel and improved pulse-width modulated power converter circuit.

SUMMARY OF THE INVENTION

The foregoing and other objects of this invention are realized in one specific illustrative embodiment thereof comprising a dc-to-dc converter having a pulse-width modulator section, a voltage converter section, and an output filter section. A feedback from the latter section is taken as an input to an error amplifier which in turn controls the modulator to vary the pulse widths of power transistor control pulses in accordance with the converter filter output variations. The voltage converter section comprises the pair of power transistors operated in a push-pull mode for alternate durations as controlled by the modulator section output pulse widths. The collector circuits of the power transistors each includes a section of the primary winding of a power transformer, the emitters being connected to a common circuit path which is in turn connected to a center-tap of the latter transformer primary winding. The latter path conventionally includes input terminals to which is connectable a voltage source the output of which is to be converted by the circuit.

In accordance with aspects of the invention directed to the problems briefly discussed in the foregoing, a current sensing transformer is serially connected in the common emitter circuit path for tapping off a signal to control a dc restore circuit for returning the transistor output pulses to their original dc level. Failure of transistor characteristics symmetry is compensated by a current imbalance detector which detects differences in amplitude of the alternating pulses appearing at the dc restore circuit. When an imbalance is detected, a flip-flop having inputs from both halves of the modulator section is set to apply an output signal to an integrator. A feedback from the latter circuit is applied to the input stage of the modulator section to increase or decrease the duration of the transistor control pulses as determined by which transistor varies in its conduction time from the symmetrical.

Monitoring of the current levels in the converter circuit is accomplished by means of the same current sensing transformer in the common emitter path and dc restore circuit employed in overcoming the foregoing transistor symmetry problem. The restore output signal there used to initiate the operation of the symmetry adjusting circuitry is simultaneously applied to three current detectors and latching circuits to control shutdown of the converter. Each detector comprises a differential amplifier controlled by the restore circuit output to compare the latter output with individual references to set respective flip-flops comprising the latching circuits if the reference level is exceeded. One detector monitors the converter output current, one monitors the input current, and one monitors changes in current. Setting any one of the flip-flops reduces the voltage on a shutdown lead connected to the modulator input section to turn off the converter.

It is thus one feature of this invention that a single signal directly representative of the internal current levels of a pulse-width modulated dc-to-dc converter is employed simultaneously to control the compensation for power transistor asymmetries, to monitor converter input and output currents, and to monitor internal current changes. The signal also ultimately controls the deactivation of the converter as determined by the magnitudes of the current levels and changes monitored.

BRIEF DESCRIPTION OF THE DRAWING

The foregoing and other objects and features of this invention will be better understood from a consideration of the detailed description of the organization and operation of one illustrative embodiment thereof when taken in conjunction with the accompanying drawing in which.

DETAILED DESCRIPTION

Figure 1:
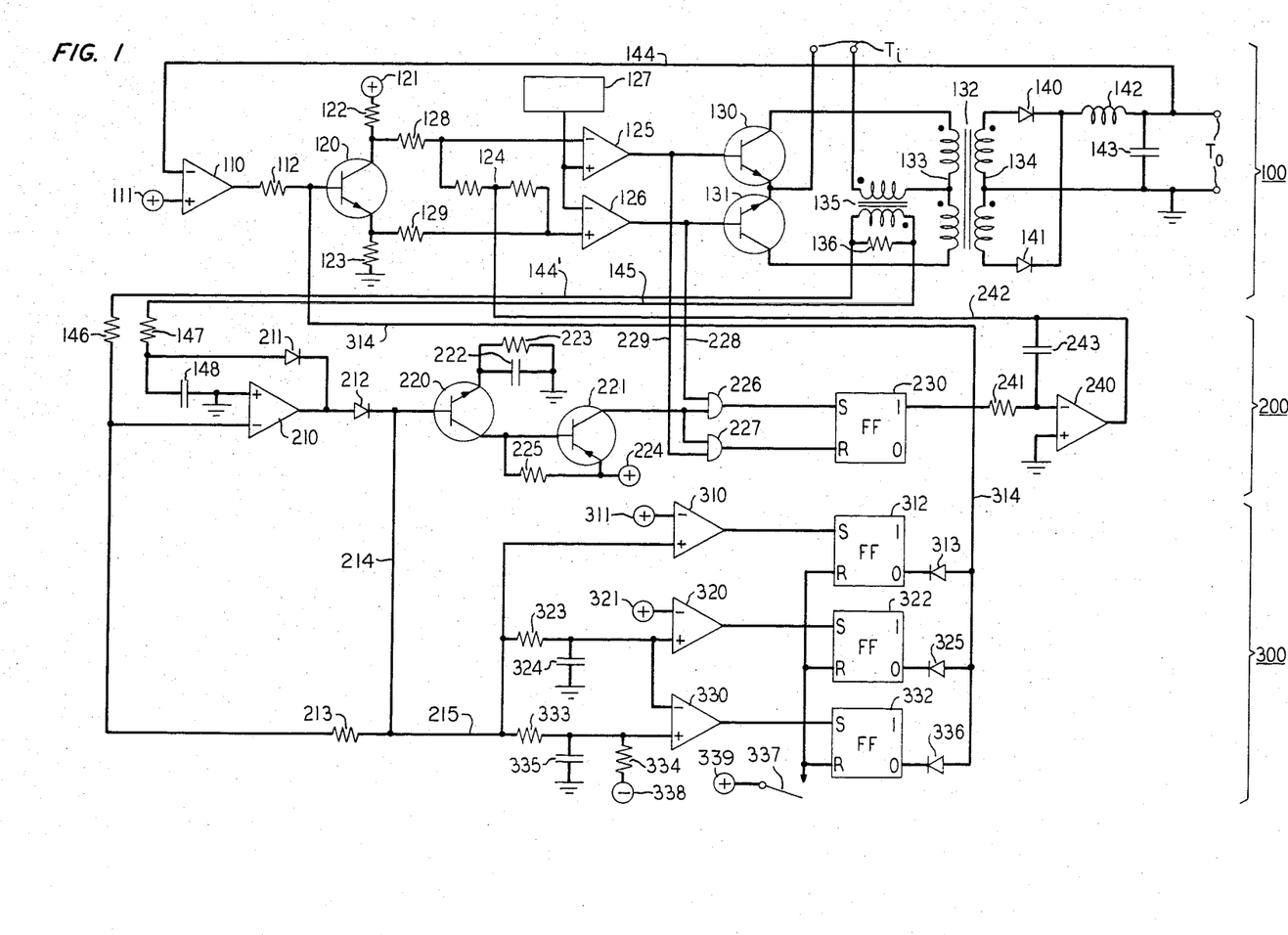
FIG. 1 depicts in schematic diagram form an illustrative dc-to-dc converter circuit according to the principles of the invention.

One specific dc-to-dc voltage converter circuit according to this invention is shown in FIG. 1 as comprising a basic pulse-width modulated converter section 100, a transistor symmetry control section 200, and a multimode current detection section 300. The converter section 100 in turn comprises an error amplifier stage including a differential amplifier 110 having one of its inputs connected to a source of reference potential 111. When operated, an output of amplifier 110 controls via a resistor 112 the conduction of an NPN inverter transistor 120 of a pulse-width modulator stage by means of its base. The collector of the latter transistor is connected to a source of positive potential 121 via a resistor 122, the emitter being connected to ground through a resistor 123. The modulator stage also comprises a pair of second differential amplifiers 125 and 126 having oppositely poled first inputs making a common connection with the output of a sawtooth voltage generator 127. The other inputs of the amplifiers 125 and 126 are connected, respectively, via resistors 128 and 129, to the collector and emitter of transistor 120. A voltage divider 124 is connected across the latter inputs of the amplifiers 125 and 126.

When operated, amplifiers 125 and 126 provide outputs to control the conduction of a pair of NPN power transistors 130 and 131 of a voltage converter stage via the respective bases of the transistors. The converter stage also comprises an output transformer 132 having a primary winding 133 and a secondary winding 134, the primary winding 133 being connected at opposite ends to the collectors of transistors 130 and 131. A pair of input terminals $T_i$ is connected between a common emitter connection of transistors 130 and 131 and a center-tap of primary winding 133. The input terminals $T_i$ are adapted to have connected thereacross a dc power source the voltage output of which is to be converted by the converter of this invention. The bridging circuit thus formed between the emitters and transformer winding center-tap also includes a sensing transformer 135 the primary winding of which is serially connected in the bridging circuit. A resistor 136 is connected across the secondary winding of transformer 135.

The converter section 100 finally terminates in an output filter stage comprising a pair of diodes 140 and 141 connected at opposite ends of the transformer secondary winding 134, the cathodes of the diodes being connected together and to one of a pair of output terminals $T_o$ via a filter inductor 142. The other of the output terminals is connected to ground and to a center-tap of secondary winding 134. The output filter stage is completed by a capacitor 143 connected across the output terminals $T_o$. An output feedback path is presented by a feedback conductor 144 connecting together one end of inductor 142 and the other input of differential amplifier 110. Both the symmetry control section 200 and multimode current detection section 300 are operated in response to current levels tapped from the voltage converter stage of section 100 by means of sensing transformer 135. The secondary winding of the later transformer is connected via a pair of conductors 144' and 145 to the input of a dc restore amplifier stage common to both the control section 200 and the detection section 300. The latter stage comprises a differential amplifier 210 having a negative input connected to one side of the secondary winding of transformer 135 via conductor 144' and a resistor 146. The other input of amplifier 210 is connected to ground and to the other side of the aforementioned secondary winding via conductor 145, a resistor 147, and a capacitor 148. A feedback connection is made from the output of amplifier 210 via a diode 211 to the junction of resistor 147 and capacitor 148. The output of amplifier 210 is also connected through a diode 212, a conductor 214, and resistor 213 to the junction of its negative input and resistor 146 connected to a side of the secondary winding of transformer 135.

The symmetry control section 200 proper begins at a current imbalance detector stage comprising a pair of transistors —an NPN transistor 220 and a PNP transistor 221. The base of transistor 220 is connected to the output of amplifier 210 via diode 212 and its collector is connected directly to the base of transistor 221. The emitter of transistor 220 is connected to ground through a parallel circuit ncluding a capacitor 222 and a resistor 223. The emitter and base of transistor 221 are connected to a source of positive potential 224, the latter electrode, via a resistor 225. The output of the detector stage is taken at the collector of transistor 221 which is connected to one input each of a pair of AND gates 226 and 227. Another input of gate 226 is connected to the output of differential amplifier 126 of the voltage converter section 100 via a conductor 228 and another input of gate 227 is connected to the output of differential amplifier 125 of the same section via a conductor 229. A flip-flop circuit 230 has its Set input connected to the output of gate 226 and its Reset input connected to the output of gate 227. The binary 1 output of flip-flop 230 controls the operation of a final stage of control section 200 comprising an integrator differential amplifier 240 which has one of its inputs connected via a resistor 241 to the flip-flop output. The other input of amplifier 240 is connected to ground. When operated, output signals of amplifier 240 are carried via a feedback conductor 242 to a tap of voltage divider 124 of the voltage converter section 100. A capacitor 243 connected between the output of amplifier 240 and the junction of one of its inputs and resistor 241 completes the organization of symmetry control section 200.

The multimode current detection section 300 comprises three parallel branches connected between the output of dc restore amplifier 210 and the base of inverter transistor 120 of voltage converter section 100. An output current detection branch comprises a first differential amplifier 310 having one of its inputs connected to a source of positive potential 311 and the other of its inputs connected directly to the junction of diode 212 and the base of transistor 220 of control section 200 via conductors 214 and 215. The output of amplifier 310 is connected to the Set input of a first flip-flop 312 which has its binary 0 output extended through a diode 313 to the aforementioned base of transistor 120 via a conductor 314. A second branch, the input current detection branch, comprises a second differential amplifier 320 which has one of its inputs connected to a source of positive potential 321 and the other of its inputs connected through a resistor 323 to the aforementioned output of amplifier 210. The last-mentioned input is also connected to ground via a capacitor 324. The output of amplifier 320 is connected to the Set input of a second flip-flop 322 which has its binary 0 output connected through a diode 325 to the conductor 314. A final branch of detection section 300, the current change branch, comprises a third differential amplifier 330 the output of which is connected to the Set input of a third flip-flop 332. Amplifier 330 has one of its inputs connected through a resistor 333 to the output of amplifier 210 and the other of its inputs connected to the branch input connection of amplifier 320. The former input of amplifier 330 is connected to a source of negative potential 338 via a resistor 334 and to ground through a capacitor 335. The binary 0 output of flip-flop 332 is connected via a diode 336 also to conductor 314.

After the voltage converter section 100 has been shut down by the action of any one of the three branch circuits of multimode current detection section 300 under the circumstances and in the manner to be described hereinafter, the flip-flops 312, 322, and 332 may be cleared or reset by the manual operation of a normally open switch 337 which closes a common circuit to a source of positive potential 339 for the Reset inputs of the flip-flops. In the foregoing description particular ones of the circuit components are shown in block or other symbol form only. Since suitable circuits for accomplishing their functions to be described in detail hereinafter are readily available or are devisable by one skilled in the art, a description of their circuit details is not essential to an understanding of the practice of this invention. With the foregoing description of the organization of one illustrative dc-to-dc converter arrangement according to this invention in mind, specific operations thereof in realizing the invention objects may now be considered with particular reference to FIGS. 2 and 3.

For purposes of describing an exemplary operation of the voltage converter section 100 of FIG. 1, it will initially be assumed that an output voltage is present across the output terminals $T_o$ which is equal to or higher than the value of the reference voltage supplied by the source 111 to one input of amplifier 110 at the error amplifier stage. The output voltage at terminals $T_o$ is fed back via conductor 144 to the other input of amplifier 110. As a result, the output of the latter amplifier, as applied to the base of inverter transistor 120, will be the lower of its possible output voltage levels. Transistor 120 will remain nonconducting with the result that its collector remains near the high level provided by the positive voltage source 121. The emitter of transistor 120 remains at a low level near ground. These collector and emitter voltage levels are graphically depicted in FIG. 2 as levels $V_a$ and $V_b$, respectively, related to a sawtooth waveform $V_c$ generated by oscillator 127 to be considered. These voltage levels are applied to respective opposite inputs of differential amplifiers 125 and 126. The sawtooth voltage $V_c$ supplied by oscillator 127 is applied to the other terminals of amplifiers 125 and 126. As the sawtooth voltage waveform $V_c$ falls below the level of the emitter input to amplifier 126 as indicated during the time $t_1$ in FIG. 2, amplifier 126 conducts to generate at its output a substantially square pulse $V_d$. Since at this time the sawtooth voltage $V_c$ is far below the high level of the negative input of amplifier 125, the latter remains nonconducting and its output is maintained at the lower of its two possible output levels. As a result of the high voltage level output of amplifier 126, power transistor 131 is rendered conductive to generate in its collector-emitter circuit a substantially trapezoidal wave current pulse also for the duration of time $t_1$ indicated as the waveform $I_a$ in FIG. 2.

Figure 2:
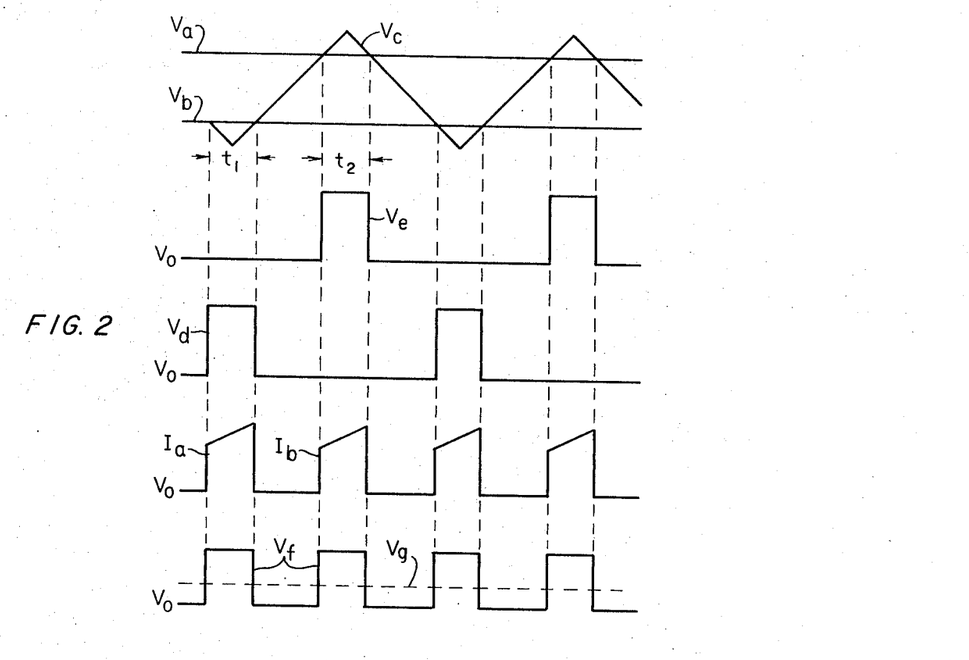
FIG. 2 depicts in idealized waveforms various signals occurring at points in the circuit of FIG. 1 during normal operation.

As the voltage $V_c$ reverses direction and begins to rise, it passes beyond the level of voltage $V_b$ at the other input of amplifier 126 at the termination of time duration $t_1$ thereby turning off the latter amplifier which in turn terminates the conduction of transistor 131 and its output current pulse $I_a$. Neither transistor 130 nor transistor 131 now conducts until the sawtooth voltage $V_c$ rises above the voltage level present at the other input of amplifier 125, which level, it will be recalled, was near that of the positive potential source 121. When voltage $V_c$ rises above voltage level $V_a$, amplifier 125 provides at its output the higher of the two possible output voltage levels for a time duration $t_2$ while the voltge $V_c$ is above the level of voltage $V_a$. This output voltage is depicted in FIG. 2 as the substantially square voltage pulse $V_e$. Power transistor 130 now conducts to generate in its collector-emitter circuit a substantially trapezoidal current pulse depicted in FIG. 2 as the waveform $I_b$. The pulse $I_b$ terminates when the voltage $V_c$ again falls below that of the collector voltage of transistor 120 and transistor 130 is turned off. One cycle of operation of the power transistor pair 130 and 131 is thus completed. It will be appreciated that these transistors will continue to be alternately driven by the outputs of amplifiers 125 and 126 as the voltage $V_c$ alternately falls below and rises above the emitter and collector voltages, respectively, of transistor 120. The manner in which these voltages may vary and why, may now be considered in connection with the operation of the remaining circuitry of the voltage converter section 100.

The current pulses $I_a$ and $I_b$ generated by transistors 131 and 130, respectively, share a common circuit path comprising a voltage source, not shown but assumed to be connected across the input terminals $T_i$, and the primary winding of sensing transformer 135. The voltage source in one advantageous application of the present invention, may comprise, for example, a 48 volt central office battery of a telephone system. The current pulses $I_a$ and $I_b$ and subsequent such pulses, the amplitude of which is determined by the output current and the primary to secondary turns ratio of transformer 132, alternately appear in the common circuit path and then appear in the two halves of primary winding 133 of output transformer 132. The pulses are transmitted via secondary winding 134 to a conventional rectifying circuit arrangement comprising diodes 140 and 141, the turns ratio of the primary and secondary windings 133 and 134 determining the ratio of the current and voltage conversion. A voltage waveform $V_f$ produced at the cathodes of diodes 140 and 141 is as illustrated in FIG. 2. At the output filter section comprising inductor 142 and capacitor 143, the converted output voltage is applied across the output terminals $T_o$ and to feedback conductor 144 to one of the inputs of error amplifier 110. Since the filter inductor 142 cannot ideally have a dc voltage across it without the current flowing therethrough increasing without bound, the output voltage must be the average of the voltage pulses $V_f$. This output is depicted as the dashed-line voltage level $V_o$ in FIG. 2.

Regulation of the output voltage $V_o$ is accomplished via the feedback conductor 144 controlling the operation of error amplifier 110. In the foregoing, it will be recalled that the output voltage $V_o$ was assumed to be equal to or greater than the reference voltage supplied by the source 111. As a result, the output of error amplifier 110 was at a low level thereby preventing the activation of inverter transistor 120. If the output voltage $V_o$ falls below that of the reference voltage from the source 111, error amplifier 110 is caused to generate a positive going output. As a result, transistor 120 is turned on with the result that the collector voltage falls and the emitter voltage rises. It will be apparent from an inspection in FIG. 2 of the relationship in time of the latter voltage levels with the voltage waveforms generated by the source 127, that, as voltage $V_a$ falls and voltage $V_b$ rises, amplifiers 125 and 126 and hence transistors 130 and 131 will conduct for longer time intervals $t_2$ and $t_1$. The duration of each of the pulses $I_a$, $I_b$, and $V_f$ will, as a result, also be extended. Since the filter output of voltage converter section 100 is proportional to the time during which transistors 130 and 131 conduct, the average output voltage $V_o$ will increase in magnitude. As the negative input of differential amplifier 110 is forced more positive via feedback conductor 144, the latter amplifier and hence transistor 120 are turned off. With the foregoing background in the operation of the voltage converter section 100 of this invention, the operation of the transistor symmetry control section 200 and the manner in which it advantageously overcomes one of the problems to which this invention is directed may now be considered.

Figure 3:
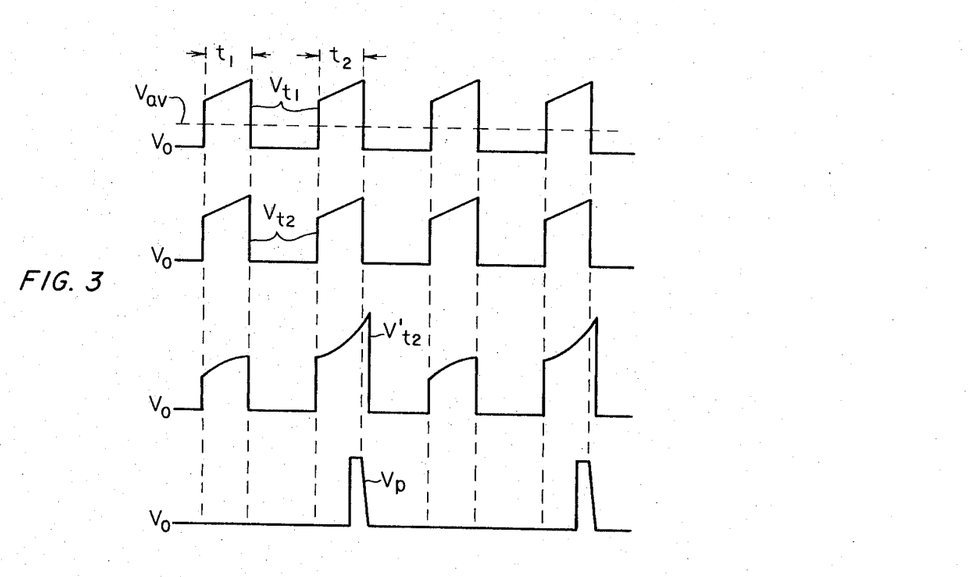
FIG. 3 depicts also in idealized waveforms various signals occuring at points in the circuit of FIG. 1 during the symmetry control mode and the multimode current monitoring mode of its operation.

The operation of control section 200 is performed in response to signals tapped from the voltage converter section 100 at the common emitter path by the current sensing transformer 135. Ideally, the output voltages appearing across resistor 136 at that point would be in the waveform as depicted in FIG. 3 as $V_{t1}$, their timing and duration corresponding to those of pulses $I_a$ and $I_b$ indicated in FIG. 2. The average dc voltage of these pulses is, of course, zero, indicated in FIG. 3 by the dashed-line voltage level designated $V_{av}$. The voltage pulses $V_{t1}$ are transmitted via conductors 144' and 145 to control the operation of the dc restore and amplifier circuit of section 200. Since that portion of the waveform corresponding to zero current in the primary winding of transformer 135 may be determined, the differential amplifier 210 is able to reestablish a proper dc voltage level at the cathode of diode 212 as depicted in FIG. 3 by the voltage pulses $V_{t2}$. More specifically, in the operation of the dc restore amplifier stage, as a voltage pulse $V_{t1}$ applied thereto via conductors 144' and 145 is in the lower of its voltage states, the voltage on the negative input of amplifier 210 rises and the output drops. As a result, diode 211 conducts and capacitor 148 is charged negatively. Transformer 135 now floats around the voltage on capacitor 148 tending to pull both sides of the transformer 135 secondary winding negatively thereby pulling the negative input of amplifier 210 back to ground potential, returning diode 211 to its nonconducting state, and establishing the original reference level for the pulses $V_{t2}$.

When the voltage pulses $V_{t1}$ go to their more positive levels, the negative input of amplifier 210 falls, its output rises, causing output diode 212 to conduct. As a result, the negative input of amplifier 210 is maintained at ground via the feedback path including resistor 213. Whenever the voltage on the latter input falls then the voltage on the base of transistor 220 rises with the result that the negative input remains at ground. Diode 212 prevents the voltage on that base from falling below ground. When the output of amplifier 210 rises and diode 212 conducts, transistor 220 of the current imbalance detector stage also is caused to conduct. However, it conducts only in response to the peaks of amplifier 210 outputs $V_{t2}$. When transistor 220 conducts, it charges capacitor 222 to the value of the base voltage less the base-emitter junction drop; the value of resistor 223 is determined as very high thereby permitting only a slight discharge of capacitor 222 during each cycle of operation. As a result, only high input voltage peaks cause further conduction of transistor 220. If one of the alternating pairs of amplifier 210 outputs is higher in amplitude than the other, only that higher amplitude pulse will cause transistor 220 to conduct. The latter condition may obtain if the characteristics of power transistors 130 and 131 are not evenly matched and, as a result, do not conduct for equal time intervals, or for various other possible reasons, output transformer 132 tends to saturate.

For purposes of description it will be assumed that for one of the above or other reasons, transistor 131 conducts for a longer duration than its associated transistor 130. As a result, transformer 132 saturates and a voltage appears on the base of transistor 220 of the waveform $V'_{t2}$ depicted in FIG. 3. Since, it will be recalled, imbalance detector transistor 220 conducts only on the peaks of the voltage applied to its base, the waveform at transistor 220 is of the opposite polarity, the voltage spike $V_p$, as indicated in FIG. 3, appears on the collector of transistor 221 as it is caused to conduct. A high voltage signal is thus applied to an imput of each of the AND gates 226 and 227. Since the other input of gate 226 is connected to the base of presently conducting power transistor 131, that imput is also high and a resulting high output of gate 226 is applied to set imbalance flipflop 230. As a result, the binary 1 output connected to an input of integrator amplifier 240 switches to its high voltage level state. As the latter input rises to ground level or above, the output of amplifier 240 falls, this negative-going signal being applied via conductor 242 to the center-tap of voltage divider 124 of converter section 100. The voltage levels $V_a$ and $V_b$ indicated in FIG. 2 being applied to inputs of amplifiers 125 and 126, respectively, will, as a result, also be shifted downwardly. An inspection of the relative voltage levels involved as depicted in FIG. 2 makes clear that as $V_a$ and $V_b$ fall while the reference level of the sawtooth waveform $V_c$ remains constant, the conduction time duration of amplifier 125, and hence transistor 130, increases while the conduction time duration of amplifier 126, and hence transistor 131, decreases. As this occurs, the imbalance of conduction times of the latter transistors is reduced to equalize their operation.

As the signals tapped at the secondary winding of transformer 135 approach equality in time as the result of the correction made in the drives of transistors 130 and 131, dc restore amplifier 210 also generates more nearly equal successive output voltages (voltage waveforms $V_{t2}$, FIG. 3). Imbalance detector transistor 220, as a result, conducts every cycle since the peaks of its drive voltages are more nearly equal. Each cycle, a high input is thus applied to an imput of both AND gates 226 and 227. The other inputs of these gates are alternately energized by the alternating high voltage levels transmitted from the outputs of amplifiers 125 and 126 via conductors 229 and 228, respectively, to alternately set and reset flip-flop 230. The resulting net output change of integrator amplifier 240 for each cycle under normal operations of converter section 100 is thus zero, thereby leaving the drive of transistors 130 and 131 under the ultimate and exclusive control of error amplifier 110. This concludes the consideration of an illustrative operative cycle of transistor symmetry control section 200 and the description now turns to a consideration of a typical operation of the multimode current detection section 300 of this invention.

At the same time that the output of dc restore amplifier 210 (waveform $V_{t2}$ and $V'_{t2}$, FIG. 3) is applied to imbalance detector transistor 220 of symmetry control section 200, it is also applied to the three-branch current detector section 300 via feedback conductor 214 and conductor 215. In a first of the three branches, the peak output current applied to secondary winding 134 of converter output transformer 132 is compared with a predetermined level. This is accomplished by applying the $V_{t2}$ signal to the positive input of a differential amplifier 310, the other input of which is supplied by predetermined reference potential source 311. The amplitude of waveform $V_{t2}$ is directly related to the output current by the winding ratios of transformers 135 and 132 and by the gain of dc restore amplifier circuit 210. If the output current exceeds a predetermined amplitude, differential amplifier 310 generates the high voltage level output of its two outputs and sets its connected flip-flop 312.

In a second of the three branches, the average input current of converter section 100 is compared with a predetermined reference level. The waveform $V_{t2}$ of FIG. 3 is applied via conductor 215 to the positive input of differential amplifier 320, the negative input of which is supplied from positive potential source 321. A filter section comprising resistor 323 and capacitor 324 averages the waveform $V_{t2}$; if the average exceeds the amplitude established by the reference of source 321, amplifier 320 switches to its high level output state and sets its associated flip-flop 322.

A final branch monitors the converter section 100 for sudden load changes. The waveform $V_{t2}$ of FIG. 3 is applied via conductor 215 to the positive input of differential amplifier 330, the negative input of which is supplied by the filtered (averaged) in put of differential amplifier 320. A filter section comprising resistor 333 and capacitor 335 also averages waveform $V_{t2}$; however, the values of the filter elements are selected so that the filter has a substantially smaller time constant than the filter section of amplifier 320. This may be achieved, for example, by determining the value of capacitor 324 greater than that of capacitor 335 while maintaining the values of resistors 323 and 333 equal. The negative potential source 338 shifts the level of the input to amplifier 330 down to a level that for a steady or for slowly changing loads, the output of amplifier 330 is at its low level state. If, on the other hand, the load and hence the current drawn increases rapidly, the output of the filter comprising resistor 333 and capacitor 335 rises more rapidly than that of the filter comprising resistor 323 and capacitor 324. In the case of a sufficiently large sudden change with a sudden increase in the drive applied to its positive input, amplifier 330 generates its high voltage level output to set its associated flip-flop 332.

The setting of any one of the flip-flops 312, 322 or 332 applies a low voltage level to the applicable 0 output. This voltage signal is transmitted via one of the diodes 313, 325, or 336 and conductor 314 to the base of transistor 120 of converter section 100 to turn off the latter element and thereby the entire converter section 100. When the condition which caused the malfuction turning off the converter has been corrected, the flip-flop which was set in response to the particular abnormal current state may be reset to restore normal operation by the manual actuation of switch 337. This closes a circuit to a positive potential source 339 for the common reset connections of the flip-flops.

What has been described in the foregoing is considered to be only one specific illustrative embodiment of the principles of this invention. Accordingly, it is to be understood that various and numerous other arrangements may be devised by one skilled in the art without departing from the spirit and scope of the invention as defined by the accompanying claims.

What is claimed is:

1. A voltage converter circuit comprising a converter stage comprising a first and a second transistor, an output transformer having a primary winding connected at opposite ends to respective corresponding first electrodes of said transistors and having a secondary winding, and a common circuit for respective corresponding second electrodes of said transistors connected at one end to a center-tap of said primary winding, said common circuit being adapted for including a source of voltage; a pulse width modulator stage comprising drive means for alternately applying a first and a second control pulse to corresponding control electrodes of said transistors for controlling conducting time durations of said transistors, said transistors alternately generating first and second output signals in said common circuit; first means for individually and selectively controlling said conducting time durations comprising a sensing transformer coupled in said common circuit for generating a first and a second current level indicator signal responsive to said first and second output signals, respectively, means for generating an imbalance signal when one of said current level indicator signals is greater in magnitude than the other of said current level indicator signals, and first control circuit means responsive to said first and second pulses and said imbalance signal for controlling said drive means to individually alter the time duration of said first and second control pulses and thereby the magnitudes of said first and second output signals in said common circuit; and second means for simultaneously controlling said conducting time durations comprising an output circuit stage connected to said secondary winding, second control circuit means including a comparator circuit responsive to signals of a predetermined magnitude for controlling said drive means to simultaneously alter the time duration of said first and second control pulses and thereby the magnitudes of said first and second output signals in said common circuit, and feedback circuit means connected to said output circuit stage for applying a portion of signals appearing in said output circuit to said second control circuit means.

2. A voltage converter circuit as claimed in claim 1 also comprising a first monitoring circuit for monitoring the output current level of said converter circuit comprising means operated responsive to said first and second current level indicator signals for comparing the magnitude of said last-mentioned signals with a first predetermined signal magnitude and means for generating a first turn-off signal when said first and second current level indicator signals are greater in magnitude than said first predetermined signal magnitude.

3. A voltage converter circuit as claimed in claim 2 also comprising a second monitoring circuit for monitoring the input current level of said converter circuit comprising means operated responsive to said first and second current level indicator signals for generating a first average signal representing the average magnitude of said first and second current level indicator signals, means for comparing the magnitude of said first average signal with a second predetermined signal magnitude, and means for generating a second turn-off signal when said first average signal is greater in magnitude than said second predetermined signal magnitude.

4. A voltage converter circuit as claimed in claim 3 also comprising a third monitoring circuit for monitoring current changes in said converter circuit comprising means operated responsive to said first and second current level indicator signals for generating a second average signal representing the average magnitude of said first and second current level indicator signals, means for lowering the reference level of said second average signal, means for comparing the amplitudes of said first and second average signals, and means for generating a third turn-off signal when the amplitude of said second average signal rises above the amplitude of said first average signal.

5. A voltage converter circuit as claimed in claim 4 also comprising circuit means operated responsive to any one of said first, second, and third turn-off signals for deactivating said drive means.

6. In a dc-to-dc voltage converter circuit, in combination, a pulse-width modulation stage comprising a first and a second conducting element, a common output circuit path for said conducting elements, a first and a second drive circuit means for alternately generating first and second drive signals for alternately causing said first and second conducting elements to generate first and second alternating output signals for predetermined time durations in said common output circuit path, and first control circuit means operated responsive to a variation of both said first and second output signals from a predetermined signal level for controlling said first and second drive circuit means to adjust said time durations of said first and second output signals in the same direction; and an output signal symmetry monitoring stage comprising a transformer connected in said common circuit path for tapping first and second monitoring signals representative, respectively, of said first and second output signals, circuit means responsive to the monitoring signal of greater amplitude when said first and second monitoring signals differ in amplitude for generating a first symmetry control signal, circuit means for combining said first symmetry control signal and said first and second drive signals for generating a second symmetry control signal, and second control circuit means operated responsive to said second symmetry control signal for controlling said first and second drive circuit means to adjust said time durations of said first and second output signals in opposite directions.

7. In a dc-to-dc voltage converter circuit, the combination according to claim 6 also comprising a current level monitoring stage comprising circuit means for comparing the amplitudes of said first and second monitoring signals with a first predetermined signal amplitude for generating a first turn-off signal when the amplitudes of said first and second monitoring signals exceed said first predetermined signal amplitude.

8. In a dc-to-dc voltage converter circuit, the combination according to claim 7, said current level monitoring stage also comprising circuit means for averaging the amplitudes of said first and second monitoring signals for generating a first average amplitude signal and circuit means for comparing said average amplitude signal with a second predetermined signal amplitude for generating a second turn-off signal when the amplitude of said first average amplitude signal exceeds said second predetermined signal amplitude.

9. In a dc-to-dc voltage converter circuit, the combination according to claim 8, said current level monitoring stage also comprising circuit means for again averaging the amplitudes of said first and second monitoring signals for generating a second average amplitude signal and circuit means for reducing the reference level of said second average amplitude signal and for comparing said second average amplitude signal with said first average amplitude signal for generating a third turn-off signal when the amplitude of said second average amplitude signal of reduced reference level exceeds the amplitude of said first average amplitude signal.

10. In a dc-to-dc voltage converter circuit, the combination according to claim 9, said current level monitoring stage also comprising circuit means responsive to any one or more of said first, second, and third turn-off signals for deactivating said first and second drive circuit means.

11. Symmetry correction circuitry for balancing signals in a first and a second switching device in a pulse-width modulated dc-to-dc converter comprising drive circuit means for alternately applying a control potential to control terminals of said switching devices for predetermined time durations for controlling said switching devices to generate a first and a second output signal and monitoring means for monitoring said output signals comprising a sensing transformer coupled in a common output circuit path of said switching devices, circuit means operated responsive to an amplitude difference in signals appearing in said sensing transformer for generating a difference potential, AND gate means for combining said difference potential with the control potential appearing on the control terminal of one of said switching devices for generating a symmetry correction signal, and correction circuit means responsive to said symmetry correction signal for controlling said drive circuit means for increasing and decreasing said predetermined time durations of the control potentials applied, respectively, to said control terminals of said switching devices.

12. Symmetry correction circuitry as claimed in claim 11 in which said drive circuit means comprises a pair of differential amplifiers each having a first and a second input, a signal generator for applying to said first inputs of both said amplifiers a potential having a substantially sawtooth waveform, and a potential source for individually applying to said second inputs of each of said amplifiers a potential of a first and second magnitude, respectively, one of said amplifiers generating a first of said control potentials when said sawtooth potential falls below said first potential, the other of said amplifiers generating a second of said control potentials when said sawtooth potential rises above said second potential.

13. Symmetry correction circuitry as claimed in claim 12 in which said correction circuit means comprises circuit means operated responsive to said symmetry correction signal for simultaneously and correspondingly altering the magnitudes of said potentials of said first and second magnitudes.

* * * * *

UNITED STATES PATENT AND TRADEMARK OFFICE
CERTIFICATE OF CORRECTION

PATENT NO. : 3,859,583

DATED : January 7, 1975

INVENTOR(S) : Ray Allen Reed

It is certified that error appears in the above-identified patent and that said Letters Patent are hereby corrected as shown below:

Column 3, line 43, delete "occuring" and insert --occurring--. Column 5, line 11, delete "1" and substitute --"1"--; line 35, delete "0" and substitute --"0"--; line 46 delete "0" and substitute --"0"--; line 57, delete "0" and substituted --"0"--. Column 9, line 12, delete "imput" and insert --input--; line 14, delete "1" and substitute --"1"--; line 41, delete "imput" and substitute --input--. Column 10, line 23, delete "in put" and substitute --input--; line 45, delete "0" and insert --"0"--; lines 50 and 51, delete "malfuction" and substitute --malfunction--.

Signed and Sealed this

Fifth Day of August 1980

[SEAL]

Attest:

SIDNEY A. DIAMOND

Attesting Officer

Commissioner of Patents and Trademarks